April 7, 1931.  H. W. ALDEN  1,799,943
TRUCK
Filed March 17, 1930
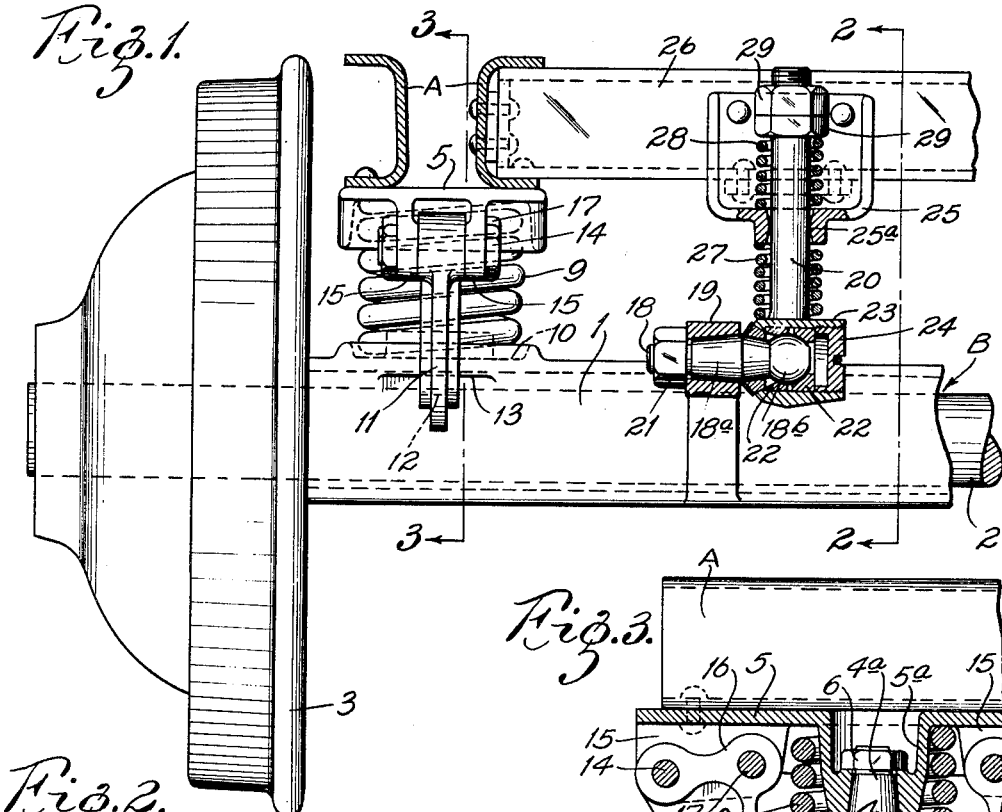
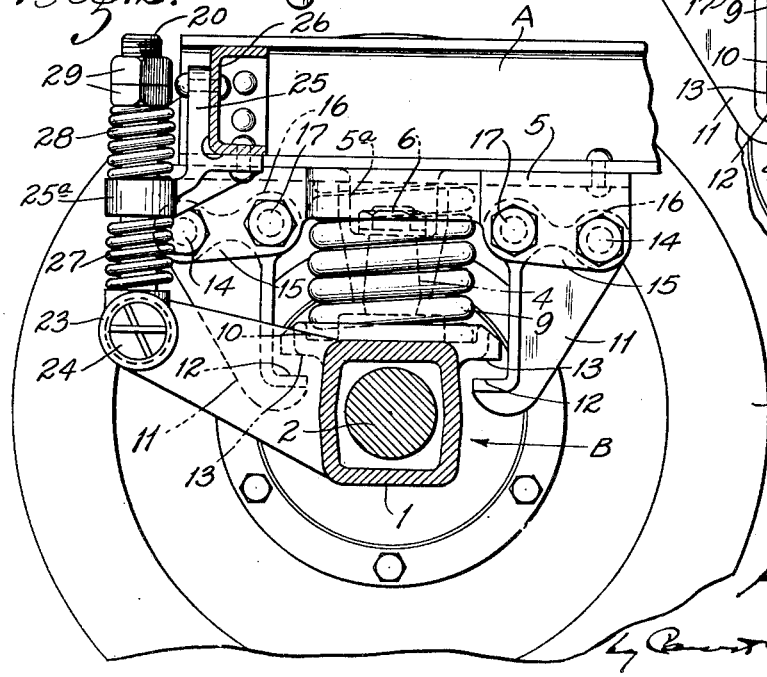
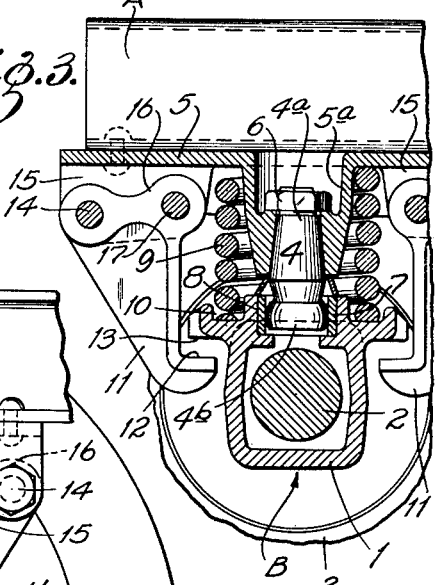
INVENTOR:
H. W. Alden
HIS ATTORNEYS.

Patented Apr. 7, 1931

1,799,943

UNITED STATES PATENT OFFICE

HERBERT W. ALDEN, OF DETROIT, MICHIGAN, ASSIGNOR TO THE TIMKEN-DETROIT AXLE COMPANY, OF DETROIT, MICHIGAN, A CORPORATION OF OHIO

TRUCK

Application filed March 17, 1930. Serial No. 436,479.

This invention relates to vehicle trucks of the type having driven axles enclosed in housings that support the truck frame. Its principal objects are to provide for holding the axle housing in proper relation to the truck frame while permitting limited vertical and tilting movement of said housing and said frame relative to each other; to provide springs for preventing road shocks from being transmitted to the truck frame; to provide for resisting the driving and braking torque on the axle housings; and to provide for simplicity and compactness of construction and economy of design. The invention consists in the truck and in the construction, combination and arrangements of parts hereinafter described and claimed.

In the accompanying drawing, wherein like symbols refer to like parts wherever they occur, Fig. 1 is a vertical cross-section through one of the side frames of a truck provided with means embodying my invention for connecting the end of the axle housing to the truck, Fig. 2 is a vertical cross-section on the line 2—2 of Fig. 1; and Fig. 3 is a similar cross-section on the line 3—3 of Fig. 1.

The accompanying drawing shows a portion of one of the side frames A of a truck and the adjacent end portion of one of the driving axles B therefor. As shown in the drawing, the driving axle B comprises an axle housing 1 and a driven live axle or shaft section 2 rotatably mounted in said housing with a road wheel 3 fixed to said axle beyond the end of said housing.

The axle housing 1 is connected to the truck side frame A by means of a stud 4 mounted in a downwardly extending boss 5a of a plate or bracket 5 that is rigidly secured flatwise to the underside of said truck side frame. The stud 4 has a tapered shank or body portion 4a, which seats within a tapered bore provided therefor in the depending boss 5a of the bracket 5 and is threaded at its upper end to receive a nut 6, which bears against the upper end of said boss and serves to draw the tapered shank of said stud into the tapered bore of said boss. The stud 4 is provided below the lower end of the boss 5a with a spherical head portion 4b which has a sliding fit in a hardened steel bushing 7 press-fitted in a circular recess 8 provided therefor in the top of the axle housing 1. The truck frame is supported from the axle housing 1 by means of a heavy coil spring 9, which is interposed between the axle housing and the stud supporting bracket 5 on the truck side frame A and loosely surrounds the stud 4 and the depending boss 5a of said bracket. The lower end of the spring 9 is seated in an annular recess 10 provided therefor in the top of the axle housing. By this arrangement, the axle housing is held in place horizontally so that the drive is transmitted to the truck frame, and it is also permitted to move vertically and to tilt endwise independently of said truck frame.

The axle housing 1 is prevented from becoming detached from the truck frame by means of two stirrups 11 that extend downwardly from the stud supporting bracket 5 one on each side of said axle housing. The stirrups 11 are provided at their lower ends with horizontally projecting portions 12 that extend beneath outstanding lugs 13 formed on the sides of the axle housing. The upper end of each stirrup 11 is pivotally secured to the stud supporting bracket 5 for vertical swinging movement transversely of the axle housing by means of a pivot bolt 14 which extends horizontally through alined openings provided therefor in said stirrup and depending lugs 15 on the underside of said bracket. Each stirrup 11 is also provided at its upper end with a laterally projecting arm 16 whose outer end is secured to the depending lugs 15 of the stud supporting bracket 5 by means of a bolt 17, thereby preventing swinging movement of said stirrup. When it is desired to remove the driving axle from the truck, the bolts 17 are removed, thereby permitting the stirrups to be rotated on the pivot bolts 14 to swing the hooked lower ends 12 thereof clear of the outstanding lugs 13 on the sides of the axle housing 1.

The tendency for the axle housing to rotate on its axis due to the driving and braking torque thereon is yieldably resisted by a torque resisting device comprising a stud 18 mounted on the outer end of an arm 19 that projects laterally from one side of the axle housing 1 and has a ball-and-socket or universal joint connection with a torque rod 20 connected to the truck frame. The stud 18 is disposed parallel to the axle housing and has a tapered shank portion 18a that seats within a tapered bore provided therefor in the torque arm 19 of the axle housing and is threaded to receive a nut 21 which bears against the torque arm and serves to draw the tapered shank of the stud into the tapered seat in said torque arm. The stud 18 carried by the torque arm is provided at its outer end with a spherical or ball shaped head 18b which works in a spherical socket or seat formed by two hardened steel bushings 22. These bushings are mounted in a transverse bore provided therefor in the enlarged lower end portion 23 of the vertically disposed torque 20, and are retained in said bore by means of a plug 24 threaded in one end thereof. The torque rod 20 slides loosely through a vertical opening 25a provided therefor in the horizontal abutment flange of a bracket 25 that is riveted or otherwise rigidly secured to a cross member 26 rigidly secured to the truck side frame A. Sleeved on the torque rod 20 between the enlarged stud receiving portion 23 at the lower end thereof and the guide bracket 25 therefor is a coil spring 27. A coil spring 28 is also sleeved on the torque rod 20 between the horizontal flange of the guide bracket 25 therefor and a pair of nuts 29 that are screwed on said rod and serve to adjust the tension of the spring 28 as well as the spring 27. The torque rod receiving opening in the horizontal flange of the guide bracket 25 is flared at each end thereof to permit tilting movement of the rod therein. With this arrangement, the roll of the axle housing caused by torque reaction is yieldably resisted by compressing the spring 27 or the spring 28, depending on the direction in which the housing rotates.

The hereinbefore described truck construction has numerous advantages. It holds the axle housing in place horizontally while permitting independent rising and falling of the ends of said housing relative to the truck frame; it provides a simple and efficient torque resisting device which does not interfere with the movement of the axle housing, it permits the axle housing to be readily detached from the truck; and it also can be produced economically and quickly and easily assembled and disassembled.

Obviously, the hereinbefore described arrangement admits of considerable modification without departing from the invention, and I do not wish to be limited to the precise construction shown and described.

What I claim is:

1. A truck comprising a frame, a tubular axle housing supporting said frame, a connection between said axle housing and said frame for yieldably resisting rotation of said axle housing in either direction, said connection comprising a torque arm rigid with said housing, a single torque rod slidably engaging said frame and having a universal joint connection with said torque arm, and springs cooperating with said torque rod and said frame for yieldably resisting the sliding movement of said torque rod.

2. A truck comprising a frame, an axle housing supporting said frame, a connection between said axle housing and said frame for yieldably resisting rotation of said axle housing in either direction, said connection comprising a torque arm rigid with said housing, a single torque rod connected to the outer end of said torque arm and slidably connected to said frame, and coil springs sleeved on said torque rod and cooperating with said frame for yieldably resisting the sliding movement of said torque rod.

3. A truck comprising a frame, an axle housing supporting said frame, a connection between said axle housing and said frame for yieldably resisting rotation of said axle housing in either direction, said connection comprising a torque arm rigid with said housing, a torque rod pivotally connected to the outer end of said torque arm and slidable through an opening provided therefor in said frame, and coil springs sleeved on said torque rod and cooperating with the latter and said frame to yieldably resist sliding movement of said torque rod in either direction.

4. A truck comprising a frame, an axle housing supporting said frame, a connection between said axle housing and said frame for yieldably resisting rotation of said axle housing in either direction, said connection comprising a torque arm rigid with said housing, a torque rod pivotally connected to the outer end of said torque arm and slidable through an opening provided therefor in an abutment on said frame, and coil springs sleeved on said torque rod between abutments thereon and the abutment on said frame.

5. A truck comprising a frame, a housing supporting said frame and provided with a laterally projecting torque arm, a bracket rigidly secured to said frame and having a vertical opening therein located above the outer end of said torque arm, a torque rod pivotally secured at one end to the outer end of said torque arm and extending upwardly through the opening in said bracket, coil springs sleeved on said torque rod above and below said bracket, and a nut threaded on the upper end of said torque rod and cooperating with the upper end of the upper spring.

6. A truck comprising a side frame, a stud depending therefrom, an axle housing located below said side frame and having an opening in the top thereof adapted to slidably receive the lower end portion of said stud, and a coil spring sleeved on said stud between the top of said axle housing and the underside of said side frame for supporting the latter.

7. A truck comprising a side frame, a stud depending therefrom, a tubular axle housing located below said side frame and having an opening in the top thereof adapted to slidably receive the lower end portion of said stud, a coil spring sleeved on said stud between the top of said axle housing and the underside of said side frame for supporting the latter, and releasable means on said side frame adapted to project beneath portions of said housing for maintaining said stud in the opening therein.

8. A truck comprising a side frame, a stud depending therefrom, an axle housing located below said side frame and having an opening therein adapted to slidably receive the lower end portion of said stud, a coil spring sleeved on said stud between said axle housing and said side frame for supporting the latter, means on side frame cooperating with said housing for maintaining said stud in the opening therein, said means comprising stirrups depending from said side frame on opposite sides of said axle housing and adapted to project beneath portions thereof, said stirrups being pivotally secured to said side frame whereby they are adapted to be swung clear of said axle housing, and means for locking said stirrups against swinging movement when said stirrups are in a position to cooperate with said axle housing.

9. A truck comprising a side frame, a stud depending therefrom and provided at its lower end with a spherical head portion, an axle housing located below said side frame and having a circular opening therein adapted to slidably receive the spherical head portion of said stud, and a coil spring sleeved on said stud between said axle housing and said side frame for supporting the latter.

10. A truck comprising a side frame, a stud depending therefrom and provided at its lower end with a spherical head portion, an axle housing located below said side frame and having a circular opening therein adapted to slidably receive the spherical head portion of said stud, a coil spring sleeved on said stud between said axle housing and said side frame for supporting the latter, and releasable means on said side frame cooperating with said axle housing for maintaining the spherical head portion of said stud in the opening in said housing.

11. A truck comprising a side frame, a stud depending therefrom and provided at its lower end with a spherical head portion, an axle housing located below said side frame and having a circular opening therein adapted to slidably receive the spherical head portion of said stud, a coil spring sleeved on said stud between said axle housing and said side frame for supporting the latter, releasable means on said side frame cooperating with said axle housing for maintaining the spherical head portion of said stud in the opening in said housing, and a torque connection between said axle housing and said truck for yieldably resisting rotation of said axle housing in either direction.

Signed at Detroit, Michigan, this 11th day of March 1930.

HERBERT W. ALDEN.